US011114867B2

(12) United States Patent
Lenzie et al.

(10) Patent No.: US 11,114,867 B2
(45) Date of Patent: Sep. 7, 2021

(54) CAPACITOR DISCHARGE TOOL

(71) Applicant: DISH Network L.L.C., Englewood, CO (US)

(72) Inventors: Kirk Lenzie, Aurora, CO (US); Eric Berg, Littleton, CO (US); Matthew Bailey, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 573 days.

(21) Appl. No.: 16/112,784

(22) Filed: Aug. 27, 2018

(65) Prior Publication Data

US 2020/0067328 A1    Feb. 27, 2020

(51) Int. Cl.
  *H02J 7/00* (2006.01)
  *H01R 13/05* (2006.01)
  *H02J 7/34* (2006.01)

(52) U.S. Cl.
  CPC .......... *H02J 7/0029* (2013.01); *H01R 13/057* (2013.01); *H02J 7/0047* (2013.01); *H02J 7/345* (2013.01)

(58) Field of Classification Search
  CPC ........ H02J 7/0029; H02J 7/0047; H02J 7/345; H01R 13/0057; H01R 4/60; H01R 4/64; H02G 7/00; H02G 1/005; H02G 1/02; Y02B 30/00; G01R 1/20
  USPC .......................................... 320/167; 307/326
  See application file for complete search history.

(56) References Cited

U.S. PATENT DOCUMENTS

| | | | | |
|---|---|---|---|---|
| 7,746,051 B1* | 6/2010 | Buchanan | .......... | G01R 1/06788 324/72.5 |
| 7,834,487 B2* | 11/2010 | Netz | ........................ | H02G 1/02 307/326 |
| 8,901,895 B2* | 12/2014 | Wice | ........................ | H02J 7/345 320/167 |
| 2013/0069677 A1* | 3/2013 | Mogaveera | ............ | G01R 1/203 324/713 |
| 2014/0202610 A1* | 7/2014 | Niles | .................... | H02G 3/0406 156/52 |
| 2015/0270674 A1* | 9/2015 | Sook | ...................... | H01R 11/14 414/732 |

* cited by examiner

*Primary Examiner* — Richard Isla
*Assistant Examiner* — Michael N DiBenedetto
(74) *Attorney, Agent, or Firm* — Kilpatrick Townsend & Stockton LLP

(57) ABSTRACT

Novel techniques are described for discharging high voltage components. For example, a tool is provided to discharge high-voltage capacitors in electrical appliances prior to servicing those appliances. The tool can include a handle structure electrically and physically isolated from a head structure by an elongated body. The elongated body can house at least a portion of a discharge circuit configured to discharge high-voltage components and to indicate (visually, audibly, etc.) whether voltage is present on components being discharged. The head structure can include multiple probes adapted to electrically couple the tool with the high-voltage components and through which to discharge the components.

18 Claims, 5 Drawing Sheets

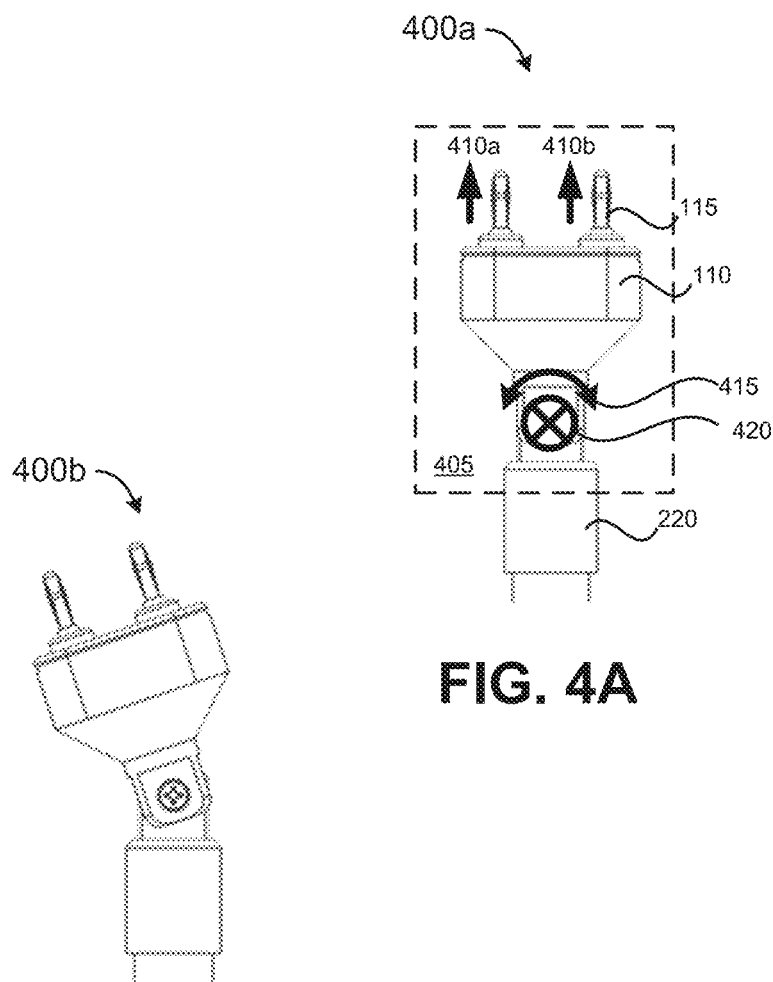
FIG. 4A
FIG. 4B
FIG. 4C
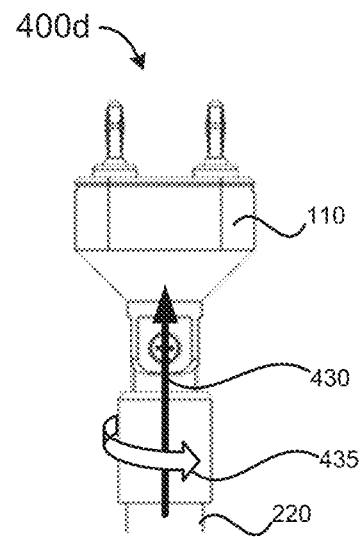
FIG. 4D

US 11,114,867 B2

CAPACITOR DISCHARGE TOOL

FIELD

This invention relates generally to electrical service equipment, and, more particularly, to discharge tools for discharging high-voltage capacitors.

BACKGROUND

A number of electrical appliances include high-voltage electronics. For example, microwave ovens, appliances with cathode ray tubes, and other devices can operate with high voltages, often storing those voltages in capacitors. When servicing such appliances, technicians typically desire to discharge the high-voltage components prior to performing repairs to avoid potential high-voltage shock hazards,

BRIEF SUMMARY

Among other things, embodiments provide novel systems and methods for discharging high voltage components. For example, a tool is provided to discharge high-voltage capacitors in electrical appliances prior to servicing those appliances. The tool can include a handle structure electrically and physically isolated from a head structure by an elongated body. The elongated body can house at least a portion of a discharge circuit configured to discharge high-voltage components and to indicate (visually, audibly, etc.) whether voltage is present on components being discharged. The head structure can include multiple probes adapted to electrically couple the tool with the high-voltage components and through which to discharge the components.

According to one set of embodiments, a capacitor discharge system is provided, The system includes: a head structure having a first probe and a second probe; a non-conductive handle structure; an elongated body coupled and extending between the head structure and the handle structure; and a discharge circuit housed at least partially by the elongated body. The discharge circuit includes: an indicator component to provide real-time indication of a presence of voltage across the first probe and the second probe; a high-power load component coupled with the indicator component; and a shunt component coupled with the indicator component.

According to another set of embodiments, a method is provided for discharging a capacitor. The method includes: positioning first and second probes of a capacitor discharge device each to be in electrical contact with a respective one of a first terminal and a second terminal of a capacitor, the positioning performed using a handle structure of the capacitor discharge device that is coupled with and electrically isolated from the first and second probes via an elongated body that houses a discharge circuit coupled with the first and second probes, such that the positioning causes the discharge circuit to provide a first real-time indication that a voltage is present across the first and second probes, and the positioning causes the discharge circuit to discharge the voltage; maintaining the first and second probes in electrical contact with the first and second terminals of the capacitor until the discharge circuit provides a second real-time indication that no voltage is present across the first and second probes; and removing the first and second probes from electrical contact with the first and second terminals of the capacitor in response to the second real-time indication.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 4A-4D include various views of the head structure and coupling structure to illustrate certain positioning and/or orientation features, according to various embodiments;

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. in the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Various types of electrical appliances, such as microwave ovens, can include high-voltage electronics. Such appliances often store high voltages (e.g., a few thousand volts) in capacitors; and, when servicing such appliances, technicians typically desire to discharge the high-voltage components prior to performing repairs to avoid potential high-voltage shock hazards. Conventionally, many technicians tend to discharge one terminal at a time to ground. However, such an approach can be ineffective. For example, while discharging each terminal to ground, the high voltage can develop on the other (e.g., floating) terminal; such that the high voltage remains on the capacitor, often unbeknownst to the technician until the technician experiences a shock or other undesirable experience. Some other conventional approaches use metal pliers, or the like, to short the capacitor. However, such tools often cannot reliably and adequately shield technicians from the high voltages present; and, with such approaches, there may be no way for a technician to know whether the discharging was effective.

Accordingly, embodiments described herein include novel tools for discharging high-voltage capacitors in a safe and reliable manner.

Figure 1:
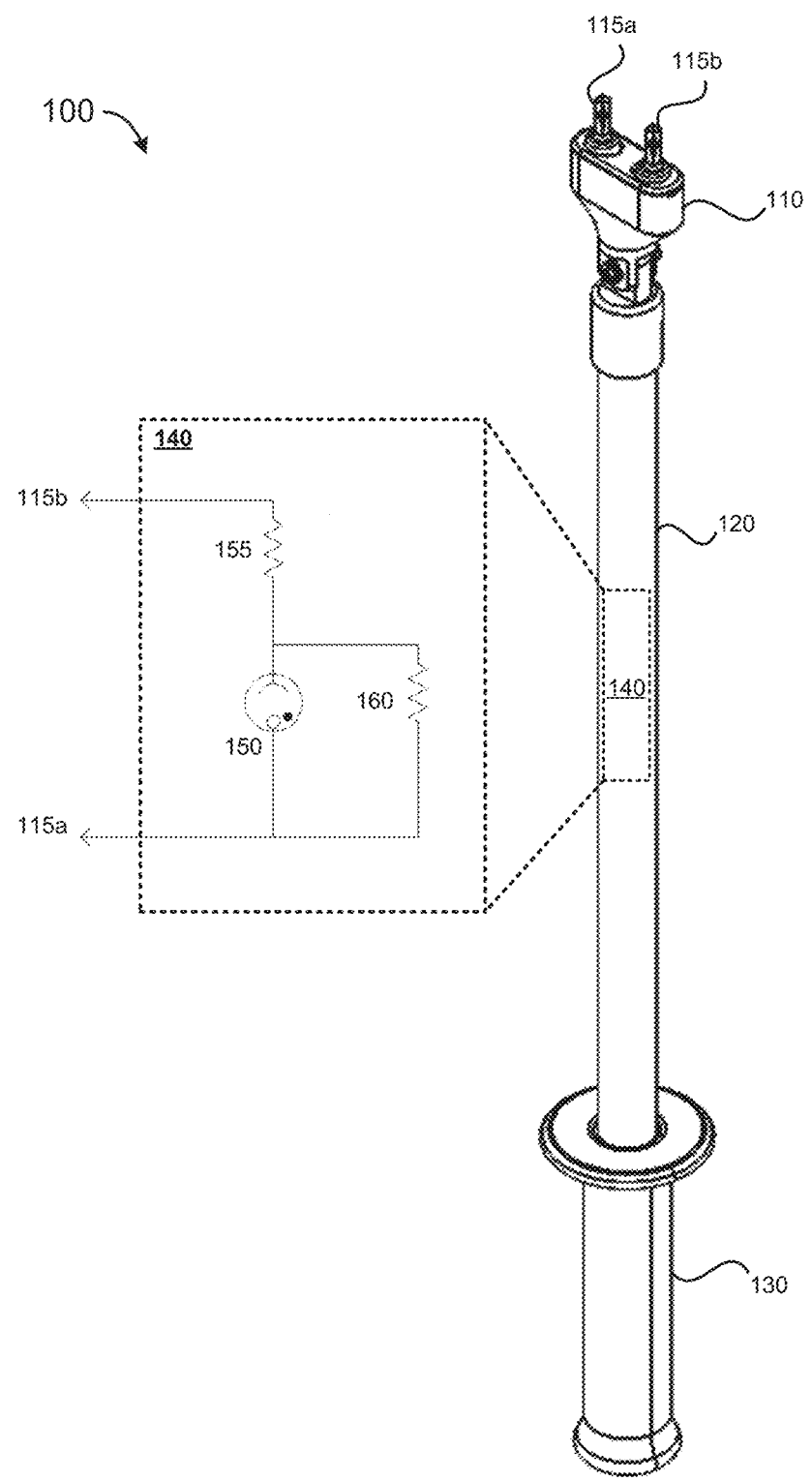
FIG. 1 shows an illustrative capacitor discharge system, according to various embodiments.

FIG. 1 shows an illustrative capacitor discharge system 100, according to various embodiments. The capacitor discharge system 100 can include a head structure 110, a handle structure 130, an elongated body 120, and a discharge circuit 140. The elongated body 120 is coupled between, and extends between, the head structure 110 and the handle structure 130. Embodiments of the head structure 110 include at least first and second probes 115. Each probe 115 is a conductive structure protruding from the head structure 110. For example, the probes 115 can include banana plugs, electrical terminals, spring clips, and/or any other suitable conductive structure. As described herein, embodiments can include various structures that facilitate orientation of the probes 115, such as by changing spacing between the probes 115, by rotating and/or pivoting the head structure 110, etc.

Embodiments of the handle structure 130 are non-conductive. For example, the handle structure 130 can be made of rubber, or any other suitable non-conductive material. Embodiments of the elongated body 120 can also be any suitable length and shape. In some implementations, the elongated body 120 is a substantially cylindrical shape, such as a tube. In other implementations, the elongated body 120 is an extruded shape, such as a rectangular prism. Embodiments of the elongated body 120 are non-conductive; the elongated body 120 can have a sufficiently high dielectric strength to provide isolation between the handle structure 130 and any components that may directly interface with high voltages (e.g., the probes 115 and/or discharge circuit 140 components, as described below). For example, the elongated body 120 separates the head structure 110 from the handle structure 130 by a distance of N inches and has a dielectric strength that is at least 5,000 volts per N inches (N is a positive real number). One embodiment of the elongated body 120 is implemented as a hollow tube made of polycarbonate plastic, which can have a dielectric strength on the order of megavolts per inch (e.g., 6 kilovolts per 0.001 inches). Though shown as separate components, embodiments of the handle structure 130 can be integrated with the elongated body 120. For example, the handle structure 130 and the elongated body 120 can be formed as a singular structure, fused into a singular structure, etc.

Embodiments of the discharge circuit 140 can include any suitable electronic components for safely and reliably and safely indicating whether a voltage is present across the probes 115, and for safely and reliably and safely discharging any voltage present across the probes 115. In some embodiments, the discharge circuit 140 includes an indicator component 150, a high-power load component 155, and a shunt component 160. In some embodiments, the high-power load component 155 and the shunt component 160 are implemented as high-power resistors. For example, the high-power load component 155 is a resistor rated for one mega-ohm of resistance and six watts of power, and the shunt component 160 is a resistor rated for one mega-ohm of resistance and one-eighth watts of power. Embodiments of the high-power load component 155 are coupled in series with the indicator component 150, and embodiments of the shunt component 160 are coupled in parallel with the indicator component 150. In some implementations, as illustrated, a first terminal of the indicator component 150 is electrically coupled with a first probe 115a, a second terminal of the indicator component 150 is electrically coupled with a first terminal of the high-power load component 155, and a second terminal of the high-power load component 155 is electrically coupled with a second probe 115b. In such implementations, first and second terminals of the shunt component 160 are coupled with the first and second terminals of the indicator component 150, respectively.

Embodiments of the indicator component 150 provide a real-time indication of whether voltage is present across the first and second probes 115. In some embodiments the indicator component 150 includes a neon lamp rated for high-voltage applications. In other embodiments, the indicator component 150 includes any suitable audible and/or visible indicator. For example, the indicator component 150 can include one or more illumination components (e.g., a bulb, display, etc.), one or more tone or buzzer generation components, etc. In some implementations, other types of indicators are used (e.g., vibrating components, etc.).

In some embodiments, the indicator component 150 provide a first real-time indication that voltage is present across the first and second probes 115, and a second real-time indication that no voltage is present across the first and second probes 115. In some such embodiments, the second indication is an absence of the first indication. For example, when the first indication includes illuminating a lamp, the second indication can include extinguishing the lamp. In other such embodiments, the first and second indications can both be active indications that are clearly distinguishable from each other. As one example, the first indication can include illuminating a red lamp, and the second indication can include illuminating a green lamp. As another example, the first indication can include sounding a buzzer, and the second indication can include illuminating a lamp. Some embodiments can include more than two indications. In one such embodiment, the discharge circuit 140 is configured to trigger a first indication when the voltage level across the probes 115 is above a predetermined hazard threshold; to trigger a second indication when a voltage is present across the probes 115, but the voltage level is below the predetermined hazard threshold; and to trigger a third indication (e.g., no indication) when no voltage is present across the probes 115.

In some embodiments, some or all of the discharge circuit 140 is housed within the elongated body 120. In some such embodiments, the entire discharge circuit 140 is house within the elongated body 120, but some or all of the elongated body 120 is configured to reveal the state of the indicator component 150. For example, where the indicator component 150 includes a visual indicator (e.g., a lamp), some or all of the elongated body 120 can be non-opaque transparent or translucent Alternatively, some or all of the indicator component 150 can be located in the handle structure 130, or in any other suitable location. For example, the indicator component 150 can include a lamp disposed within the elongated body 120 and one or more optical components (e.g., fiber-optic filaments, mirrors, etc.) to permit viewing of illumination from the lamp in a location removed from the lamp (e.g., in the handle structure 130). In some embodiments, higher voltage components are disposed within the elongated body 120 in a region closer to the probes 115 and farther from the handle structure 130.

Figure 2:
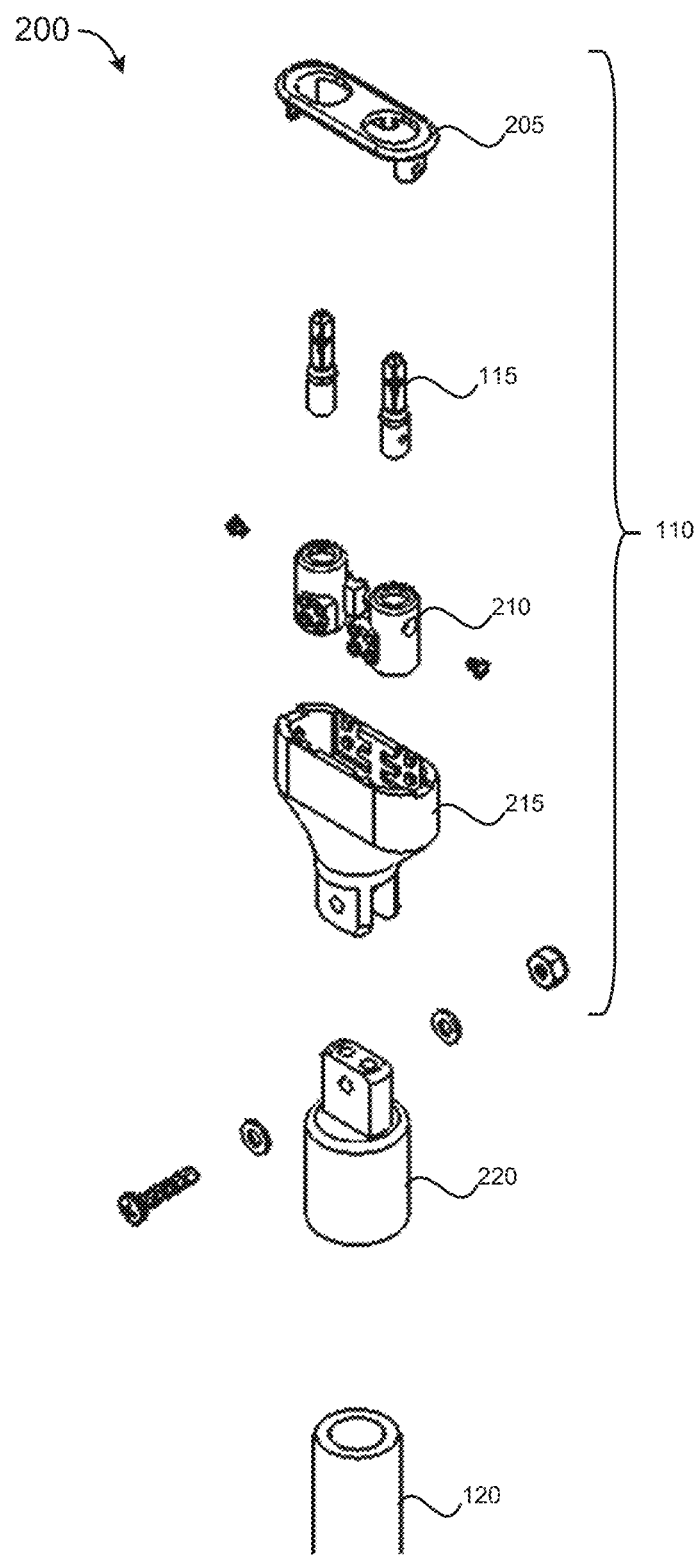
FIG. 2 shows an exploded view of an illustrative portion of a capacitor discharge system, like the capacitor discharge system of FIG. 1, according to various embodiments.

FIG. 2 shows an exploded view 200 of an illustrative portion of a capacitor discharge system, like the capacitor discharge system 100 of FIG. 1, according to various embodiments. The illustrated portion shows a portion of the elongated body 120 coupled with the head structure 110 via a coupling structure 220. The head structure 110 includes the first and second probes 115, first and second probe carriages 210, a cord funnel 215, and a funnel cap 205. Assembly of the head structure 110 can involve seating each probe 115 in a respective one of the probe carriage 210, seating the probe carriages 210 in the cord funnel 215, and securing the probe carriages 210 in the cord funnel 215 (and/or securing the probes 115 in the probe carriages 210) using the funnel cap 205.

Though not shown, the cord funnel 215 can be configured to house some or all of the discharge circuit 140. In some implementations, the cord funnel 215 includes a path through which wires can be routed to electrically couple the probes 115 with portions of the discharge circuit 140 disposed in the elongated body 120, or another location. In other implementations, the cord funnel 215 can include the indicator component 150. For example, a portion of the cord funnel 215 can be non-opaque to permit viewing of an indicator lamp disposed within the cord funnel 215, the probes 115 can be configured to illuminate as the indicator component 150 of the discharge circuit 140, etc.

In some implementations, one or both probes 115 is removably coupled with the probe carriages 210. example, such a removable coupling can facilitate replacement of probes 115 in the event of wear, or the like; and/or can facilitate use of different types of probes 115. For example, embodiments can support multiple probe 115 sizes, lengths, shapes, etc. One such implementation is illustrated in FIG. 2, in which small screws, or other structures, can be used to removably secure the probes 115 in their respective probe carriages 210.

Figure 3A:
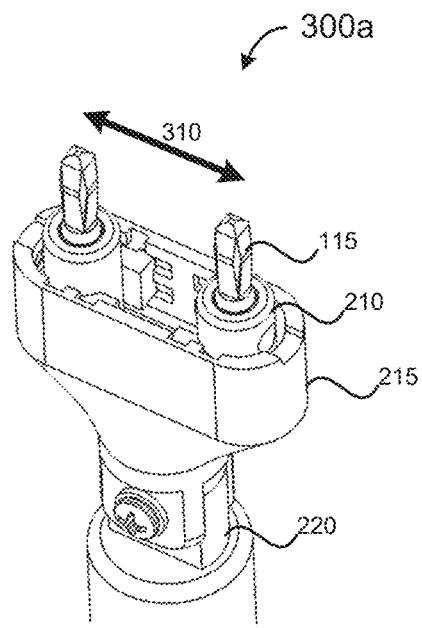
FIGS. 3A and 3B show illustrative views of the head structure without the funnel cap and with the funnel cap, respectively, according to various embodiments.
Figure 3B:
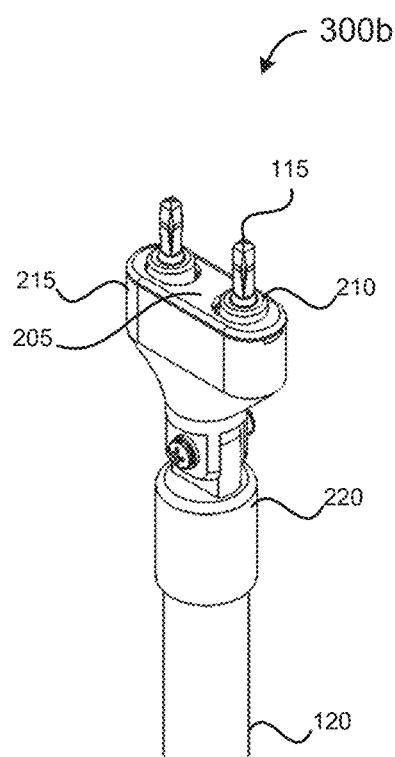

The head structure 110 assembly can be configured to provide various additional features, such as repositioning of the probes 115. For example, FIGS. 3A and 3B show illustrative views 300 of the head structure 110 without the funnel cap 205 and with the funnel cap 205, respectively, according to various embodiments. In the illustrated embodiment, the probe carriages 210 are configured to be movably coupled (e.g., slidably coupled) with the cord funnel 215. For example, each of the probe carriages 210 has structure to interface with a channel in the cord funnel 215 in such a way that the probe carriages 210 can slide relative to one another. The sliding can be used to change the spacing between the probes 115 (e.g., indicated by arrow 310), for example, for use with discharging different sizes and types of high-voltage components (e.g., having terminals with different spacings). In sonic embodiments, the probe carriages 210 can be movably coupled with the cord funnel 215 in a manner that permits remote control of the spacing. For example, an electrical and/or mechanical mechanism in the handle can be configured to adjust the spacing of the probes 115 by adjusting the relative positions of the probe carriages 210 in the cord funnel 215.

Returning to FIG. 2, the head structure 110 can be coupled with the elongated body 120 via a coupling structure 220. In some embodiments, the coupling structure 220 is configured to affix the head structure 110 in a single position with respect to the elongated body 120. In other embodiments, the coupling structure 220 can be configured to permit one or more types of movement of the head structure 110 with respect to the elongated body 120. For example, the coupling structure 220 can provide rotational movement, pivoting movement, telescoping movement, and/or any other suitable type of movement. Further, some embodiments can be configured to permit remote control of the head structure 110 movement. For example, an electrical and/or mechanical mechanism in the handle can be configured to adjust the position and/or orientation of the head structure 110 with respect to the elongated body 120.

For the sake of illustration, FIGS. 4A-4D include various views 400 of the head structure 110 and coupling structure 220 to illustrate certain positioning and/or orientation features, according to various embodiments. Turning first to FIG. 4A, the head structure 110 and coupling structure 220 are shown. The first and second probes 115 extend along a first vector 410a and a second vector 410b, respectively; and the first and second vectors 410a,b define a plane 405. The coupling structure 220 includes a pivot coupling that couples the head structure 110 with the elongated body 120 in such a way that the head structure 110 is pivotable about an axis 420 normal to the plane 405 with respect to the elongated body (the pivot direction is indicated by arrow 415). FIGS. 4B and 4C illustrate configurations with the head structure 110 pivoted to the left and to the right, respectively.

Additionally or alternatively, embodiments of the coupling structure 220 can permit rotational movement. As illustrated in FIG. 4D, the elongated body 120 is shown extending along an axis 430 (between the handle structure 130 [not shown] and the head structure 110). The coupling structure 220 can include a rotational coupling that couples the head structure 110 with the elongated body 120 in such a way that permits the head structure 110 to rotate about the axis 430 with respect to the elongated body 120. The rotation is illustrated by arrow 435.

Figure 5:
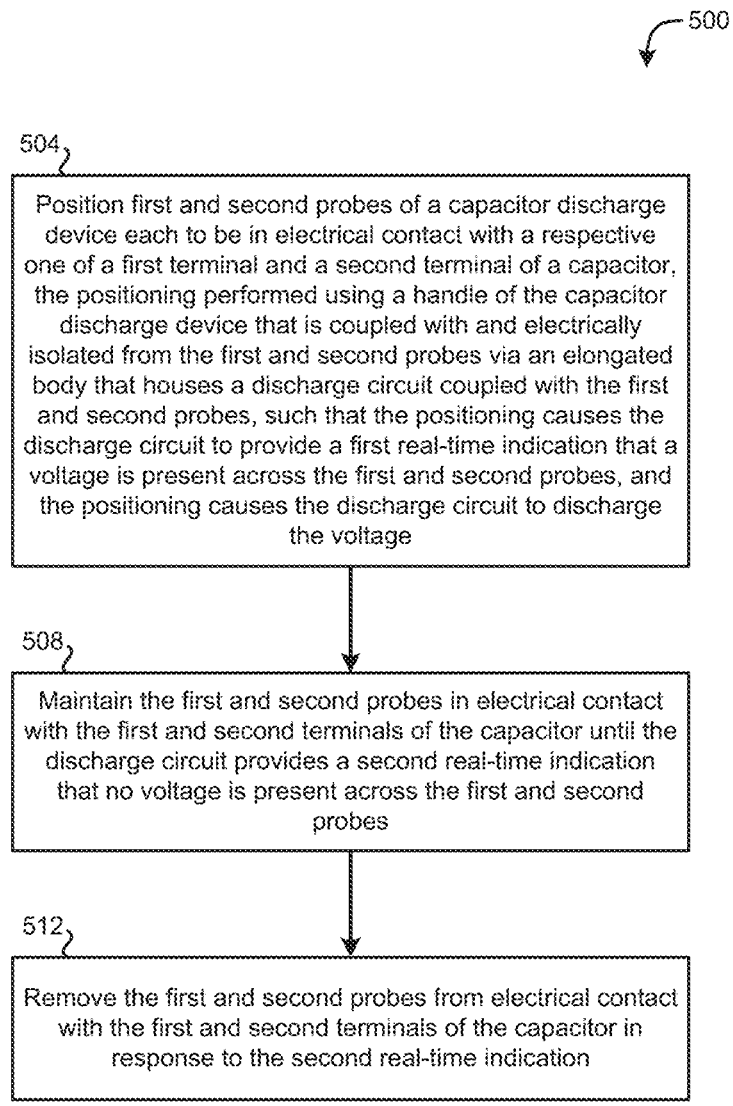
FIG. 5 shows a flow diagram of an illustrative method, according to various embodiments.

Systems including those described above can be used to implement various methods 500. FIG. 5 shows a flow diagram of an illustrative method 500, according to various embodiments. Embodiments of the method 500 can be performed by a human or automated actor. Embodiments of the method 500 begin at stage 504 by positioning first and second probes of a capacitor discharge device each to be in electrical contact with a respective one of a first terminal and a second terminal of a capacitor. The positioning can be performed using a handle structure of the capacitor discharge device that is coupled with and electrically isolated from the first and second probes via an elongated body. The elongated body can house at least a portion of a discharge circuit that is electrically coupled with the first and second probes, such that the positioning causes the discharge circuit to provide a first real-time indication that a voltage is present across the first and second probes. For example the real time indication can include an audible or visible indication, such as illumination of a lamp or display, sounding of a tone or buzzer, etc. Further, the positioning causes the discharge circuit to discharge the voltage.

At stage 508, embodiments can maintain the first and second probes in electrical contact with the first and second terminals of the capacitor until the discharge circuit provides a second real-time indication that no voltage is present across the first and second probes. In some implementations, the second indication is an absence of the first indication (e.g., where the first indication is an illuminated lamp, the second indication can be that the lamp subsequently extinguishes). In other implementations, the second indication can be any suitable audible and/or visible indication that is distinguishable from the first indication. For example, The first indication can be illumination of a red lamp, and the second indication can be illumination of a green lamp. At stage 512, embodiments can remove the first and second probes from electrical contact with the first and second terminals of the capacitor in response to the second real-time indication.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined.

Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure. Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A capacitor discharge system comprising:
a head structure having a first probe and a second probe;
a non-conductive handle structure;
an elongated body coupled and extending between the head structure and the handle structure; and
a discharge circuit housed at least partially by the elongated body, the discharge circuit having:
an indicator component to provide real-time indication of a presence of voltage across the first probe and the second probe;
a high-power load component coupled with the indicator component; and
a shunt component coupled with the indicator component.

2. The capacitor discharge system of claim 1, wherein:
the indicator component has first and second indicator terminals, the first indicator terminal coupled with the first probe;
the high-power load component is coupled between the second indicator terminal and the second probe; and
the shunt component is coupled between the first and second indicator terminals.

3. The capacitor discharge system of claim 1, wherein:
each of the high-power load component and the shunt component is rated for at least one mega-ohm of resistance; and
the high-power load component is rated for at least one watt of power.

4. The capacitor discharge system of claim 1, wherein the head structure further comprises:
a first probe carriage coupled with the first probe; and
a second probe carriage coupled with the second probe, wherein at least one of the first probe carriage or the second probe carriage is movably coupled with the head structure, so as to adjust a spacing between the first probe and the second probe.

5. The capacitor discharge system of claim 4, wherein:
the first probe is removably coupled with the first probe carriage; and
the second probe is removably coupled with the second probe carriage.

6. The capacitor discharge system of claim 4, wherein the head structure further comprises:
a cord funnel configured to receive the first and second probe carriages.

7. The capacitor discharge system of claim 6, wherein the head structure further comprises:
a funnel cap configured to secure the first and second probe carriages in the cord funnel.

8. The capacitor discharge system of claim 6, wherein the cord funnel comprises routing structure through which wires are routed to electrically couple the probes with the discharge circuit.

9. The capacitor discharge system of claim 1, wherein the elongated body extends along an axis between the handle structure and the head structure, and further comprising:
a rotational coupling that couples the head structure with the elongated body, such that the head structure is rotatable about the axis with respect to the elongated body.

10. The capacitor discharge system of claim 1, wherein the first probe extends along a first vector, and second probe extends along a second vector, the first and second vectors define a plane, and further comprising:
a pivot coupling that couples the head structure with the elongated body, such that the head structure is pivotable about an axis normal to the plane with respect to the elongated body.

11. The capacitor discharge system of claim 1, wherein:
the indicator component comprises a neon indicator lamp.

12. The capacitor discharge system of claim 1, wherein:
the indicator component provides a visual indication of the presence of voltage across the first probe and the second probe; and
the indicator component is disposed within the elongated body in such a way that the visual indication is visible through at least a portion of the elongated body.

13. The capacitor discharge system of claim 1, wherein the elongated body is substantially cylindrical.

14. The capacitor discharge system of claim 1, wherein the elongated body is a substantially hollow tube.

15. The capacitor discharge system of claim 1, wherein the elongated body is made of polycarbonate plastic.

16. The capacitor discharge system of claim 1, wherein the elongated body separates the head structure from the handle structure by a distance of N inches and has a dielectric strength that is at least 5,000 volts per N inches, where N is a positive real number.

17. The capacitor discharge system of claim 1, wherein each of the first and second probes is a banana plug.

18. A method for discharging a capacitor, the method comprising:
positioning first and second probes of a capacitor discharge device each to be in electrical contact with a respective one of a first terminal and a second terminal of a capacitor, the positioning performed using a handle structure of the capacitor discharge device that is coupled with and electrically isolated from the first and second probes via an elongated body that houses a discharge circuit coupled with the first and second probes, such that the positioning causes the discharge circuit to provide a first real-time indication that a voltage is present across the first and second probes, and the positioning causes the discharge circuit to discharge the voltage;

maintaining the first and second probes in electrical contact with the first and second terminals of the capacitor until the discharge circuit provides a second real-time indication that no voltage is present across the first and second probes; and removing the first and second probes from electrical contact with the first and second terminals of the capacitor in response to the second real-time indication.

\* \* \* \* \*